United States Patent [19]
Heintzman

[11] Patent Number: 6,032,445
[45] Date of Patent: Mar. 7, 2000

[54] COMBINE HEADER GRAIN CATCH PANS

[76] Inventor: Rick Heintzman, R.R. 2, Box 265, Onaka, S. Dak. 57466

[21] Appl. No.: 09/150,844

[22] Filed: Sep. 10, 1998

[51] Int. Cl.[7] .................................................. A01D 45/02
[52] U.S. Cl. ................................. 56/119; 56/126; 56/84
[58] Field of Search .............................. 56/119, 94, 126, 56/329, 330, 84

[56] References Cited

U.S. PATENT DOCUMENTS

| | | |
|---|---|---|
| 325,109 | 9/1885 | Naff . |
| 1,186,832 | 6/1916 | Pridgen . |
| 1,368,014 | 2/1921 | Bauert et al. . |
| 2,795,922 | 6/1957 | Hume ...................................... 56/257 |
| 3,260,041 | 7/1966 | McRoberts et al. ........................ 56/119 |
| 3,844,094 | 10/1974 | Janzen ....................................... 56/126 |
| 3,995,413 | 12/1976 | Lynch ........................................ 56/119 |
| 4,009,557 | 3/1977 | Reicks ........................................ 56/98 |
| 4,255,920 | 3/1981 | Janzen ....................................... 56/126 |
| 4,266,394 | 5/1981 | VanGinhoven et al. ................... 56/119 |
| 4,301,644 | 11/1981 | Henderson ................................ 56/14.3 |
| 4,429,516 | 2/1984 | Erickson ..................................... 56/95 |
| 4,445,314 | 5/1984 | Gust ........................................... 56/126 |
| 4,538,404 | 9/1985 | Heimark, Jr. et al. ..................... 56/126 |
| 4,584,825 | 4/1986 | Atkinson ................................... 56/119 |
| 4,729,212 | 3/1988 | Rabitsch ................................... 56/119 |
| 5,105,610 | 4/1992 | Britten ...................................... 56/298 |
| 5,806,292 | 6/1997 | Luecke ...................................... 56/119 |

FOREIGN PATENT DOCUMENTS

| | | | |
|---|---|---|---|
| 2550911 | 3/1985 | France ...................................... 56/119 |
| 2807822 | 9/1978 | Germany .................................. 56/119 |

*Primary Examiner*—Thomas B. Will
*Assistant Examiner*—Arpad Fabian Kovacs
*Attorney, Agent, or Firm*—Westman, Champlin & Kelly, P.A.

[57] ABSTRACT

A set of pans are provided for catching grain such as sunflower heads, that are broken from the stalks as they are being harvested. The pans are mounted onto the cutter bar and leave a space at the desired spacing of the rows of the crop being harvested. The leading ends of the pans are pointed, and have different tapers on each side. Every other pan is shorter than the intermediate pans, as well, for serving to guide the stalks positively into the slots for cutting. The pans catch heads of grain that might be broken or shaken loose and otherwise lost. The pans are pivotally mounted, quickly attached or detached, and the angle of the bottom of the pan can be adjusted.

7 Claims, 7 Drawing Sheets

COMBINE HEADER GRAIN CATCH PANS

BACKGROUND OF THE INVENTION

The present invention relates to a set of plant stalk guide and grain catch pans for a combine header that mount ahead of the cutter bar and which have leading ends that are pointed, for separating stalks of crops, such as sunflowers that are planted in rows or solid seeded but which lodge or flatten, and for guiding the stalks into a slot for each row for cutting. The leading edges of the pans have different leading angles on opposite sides for guiding in stalks and every other pan is shorter in forward extension than the adjacent pans so the stalks from each ride guided to a center slot at different positions.

The problem of losing grain that is easily shattered from the stalk, such as sunflowers, or even corn, has been recognized. Various devices have been utilized for pick-up downed corn or similar row crops, but these are usually either are flat plates, or rounded "snouts" or tapered members that move along the space between rows of crop and cause a lifting action.

A sunflower harvesting attachment that is designed to catch the heads of the plants as they are severed and cause them to be conveyed back to the combine header is shown in U.S. Pat. No. 4,255,920. The attachment is large and appears to be difficult to mount, and does not provide the guiding tapers of the present invention.

The attachment shown in patent '920 includes bristles 71 in the slots through which the grain stalks pass, to catch seeds that have been shattered. The pans are cantilevered out from a support platform and are not supported near their outer ends for adjustment.

SUMMARY OF THE INVENTION

The present invention relates to divider pans that lift and guide stalks of crops and which are used for catching grain such as sunflower seeds that may be shaken loose from the heads before the heads reach the header of a combine. The pans are elongated and extend forwardly from a cutter bar of a combine header of conventional design, and have tapered outer ends formed by side edges that taper from a point out to side edges. The side edges on each catch pan taper from the point at different angles on the opposite edges. This means that the tapered edges on each pan are different length. This provides different loads and positioning on the stalks as they are moved to aid in guiding the grain stalks into the slot space between adjacent pans. The slot provides a passage to the cutter bar so as the combine moves forward, the stalks are cut and the grain heads or ears are moved to the separation cylinder. Every other catch pan is also shorter than the adjacent pans, so that the stalks that are laying down are not engaged simultaneously, but first by one pan and then by the other. This helps lifting and centering of the stalks. The stalks feed in sequentially from end side of the slot by the lead in edges of the catch pans.

The catch pans have upstanding edge walls so they will collect grain, such as sunflower seeds and heads, and by properly inclining the pan or tilting the header, the heads and grain that collect on the pans move back to the combine header and then to the combine separator cylinder for processing.

The catch pans mount on individual brackets that are attached to the main cutter bar frame of the combine. The catch pans are quickly removed from the brackets for permitting use of the header in a normal manner without the catch pans. A support strut is provided that extends from underneath the leading end of the pans back to a bracket mounted on the cutter bar frame, and this support strut is adjustable in length so that the angle of the pans can be changed and positively held in position.

DETAILED DESCRIPTION OF THE PREFERRED EMBODIMENTS

Figure 1:
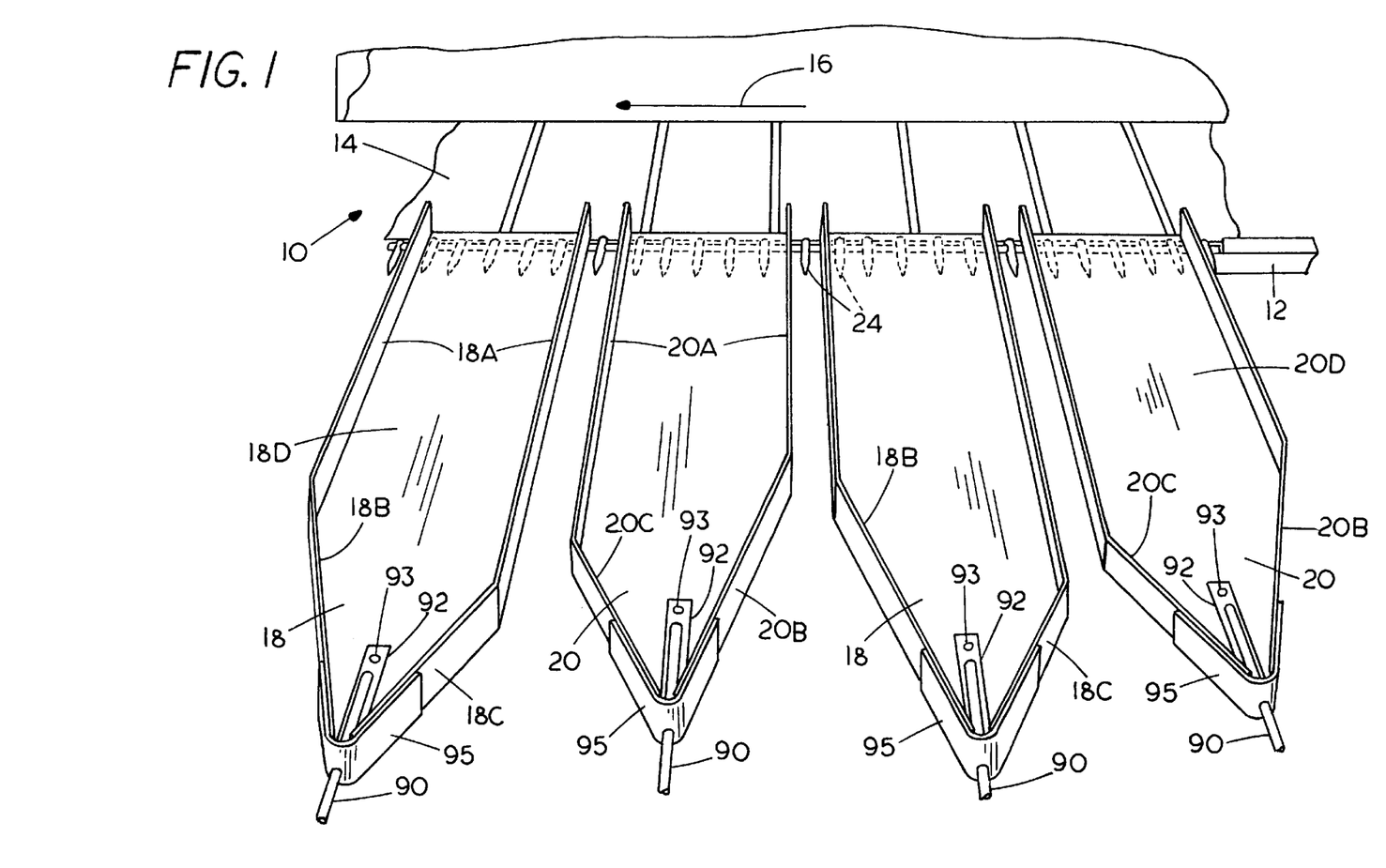
FIG. 1 is a schematic fragmentary top view of a forward edge of a header of a combine showing catch pans installed on a cutter bar frame forming the leading frame member of the header.

A well-known combine header indicated generally at 10 is shown only fragmentarily. Operation of header cutter bars, sickles and sickle guards are well known, and do not form part of the present invention except for providing a mounting location. A cutter bar support frame member 12 provides a main support member for the cutter bar. An apron or conveyor 14 is mounted on suitable rollers and is driven to move cut crop material from the cutter bars in toward the center of the combine as indicated by the arrow 16. The crop that is cut is moved to a threshing cylinder in a conventional manner. A plurality of forwardly extending catch pans 18 and 20 are mounted on the cutter bar frame 12 in a suitable manner, and extend forwardly a desired amount. Four such pans are shown in FIG. 1, but of course they would extend across the entire header structure.

Figure 2:
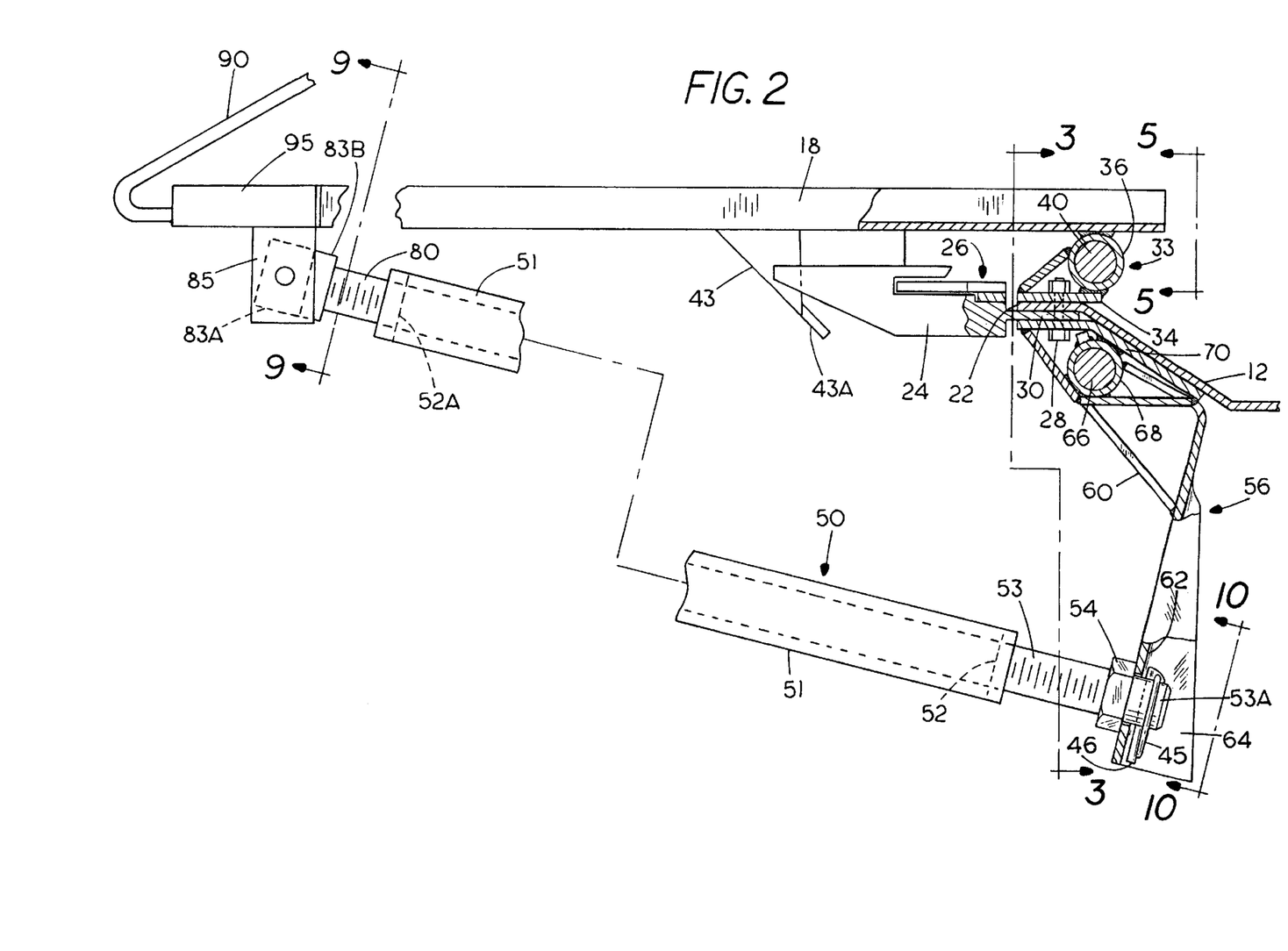
FIG. 2 is a sectional view taken as on line 2—2 in FIG. 1.

Referring to FIG. 2, the arrangement of the mounting of the catch pans 18 and 20 is more clearly seen. While pans 18 and 20 are different lengths, they are mounted to the combine header identically. The main cutter bar frame member 12 can be any desired shape, but generally will have a horizontal lip 22 and a portion that curves down and rearwardly from the lip 22. Lip 22 supports sickle guards 24 in a normal manner. A sickle assembly 26 is mounted on the sickle guards 24, and is driven from one end reciprocally in order to cut material that passes between adjacent guards 24 in a known manner. The sickle guards 24 are usually in an assembly of at least two points and are held in place with one or more sickle guard bolts 28 that pass through a tang portion 30 of the sickle guard assembly and through the lip 22 of the frame member 12 to hold the sickle guard 24 clamped in place, above the lip 22.

Figures 5, 6, 7:
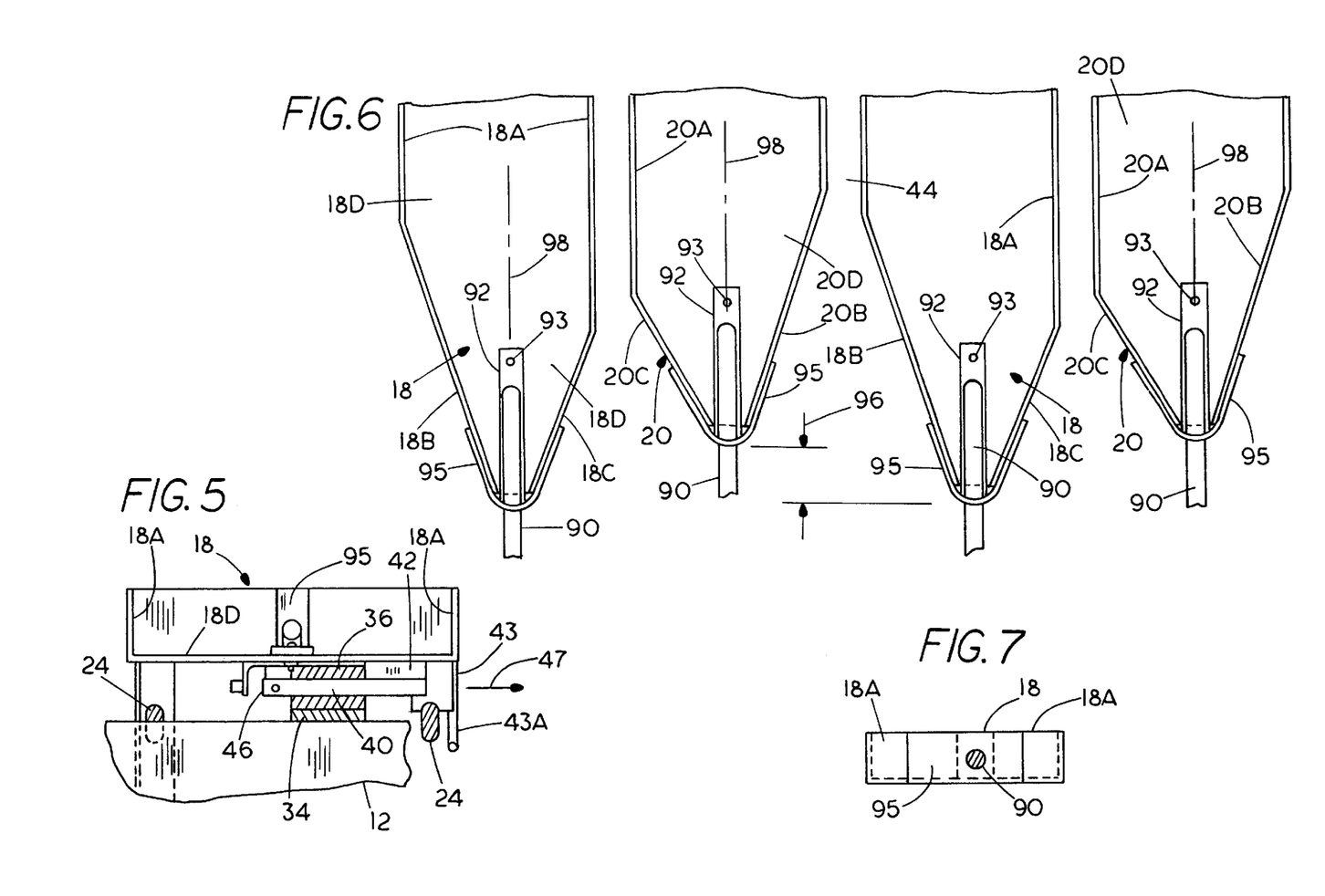
FIG. 5 is a rear view of rear end portions of a catch pan of the present invention looking forwardly.
FIG. 6 is a fragmentary top plan view of the catch pans shown in FIG. 1.
FIG. 7 is a front view of a typical catch pan showing the mounting of a divider rod.

In this form of the invention, a catch pan mounting bracket 33 that has a mounting plate 34 is bolted in place with the sickle guard bolt 28. Bracket 33 includes a tubular hub 36 on the upper side of the plate 34 that protrudes above the sickle guard level and also above the end of the sickle guard bolt 28. A separate catch pan (typically shown at 18) is mounted in each hub 36 with a pivot pin 40 that is welded to a support 42 on the bottom of the pan with an appropriate spacing for clearance for the outer end of the pivot pin which is spaced from the bottom wall of the pan. The outer end of the pin 40 cantilevers laterally toward the center as shown in FIG. 5. This will permit the pans 18 and 20, which are mounted the same way, to pivot about a horizontal axis at their inner or base ends so that the tapered outer ends of the pans can be raised and lowered relative to the pivotally mounted base ends which are above the cutter bar. The pans 18 and 20 have tapered downwardly extending guides 43 along the side edges. The guides fit on opposite sides of a pair of sickle guards to limit the lateral movement of the pans. The guides 43 are shaped to permit up and down movement of the outer ends of the pans without permitting much lateral movement. A guide rod 43A extends downwardly from the lower end of each guide 43 and moves along side the adjacent sickle guard as the pan moves upwardly.

Figure 3:
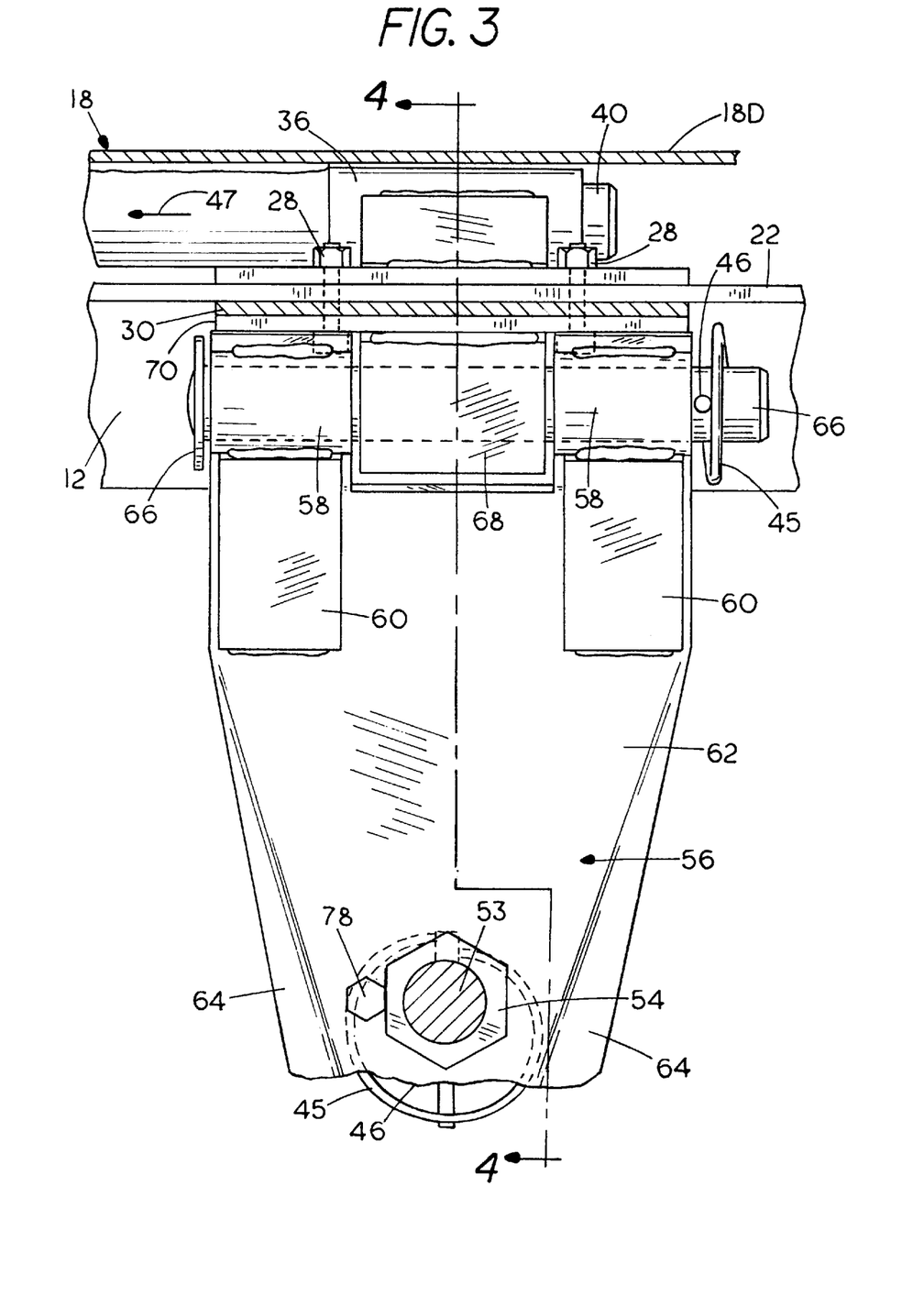
FIG. 3 is a front view of a mounting bracket for the catch pan taken as on line 3—3 in FIG. 2, with parts in section to show the mounting pin holding the catch pan in place.

The entire pan 18 or 20 can be pulled out by moving it laterally as indicated by the arrow 47 in FIG. 3 and removing it from the hub 36 when the pans are pivoted up so the guides 43 clear the sickle guards 24. The guides 43 overlap only the points of the guards they are associated with and as the pans pivot up, the guides clear the guards as the pans swing up. The pins 40 also can be held in place with a cotter pin or other retainer, if desired.

Figure 9:
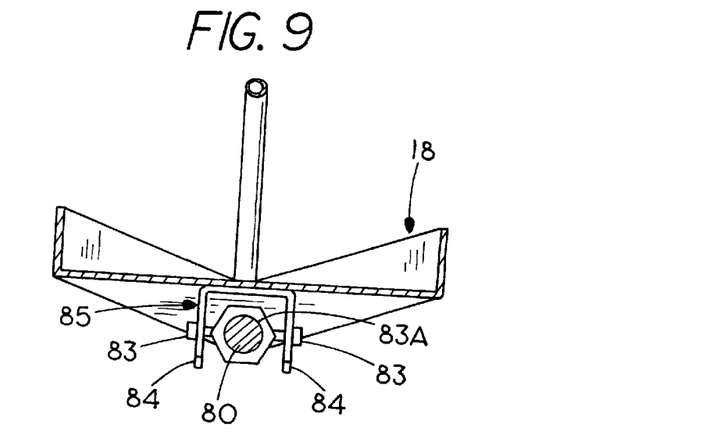
FIG. 9 is a sectional view taken on line 9—9 in FIG. 2.
Figure 11:
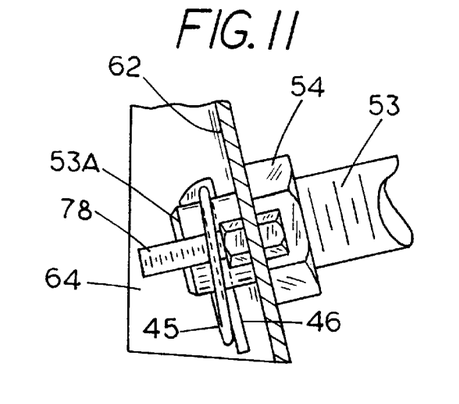
FIG. 11 is a fragmentary sectional view taken on line 11—11 in FIG. 10.

The angle of the grain catch pans 18 and 20 about the axis of the pins 40 is controlled by a strut assembly 50 shown fragmentarily in FIG. 2. The strut assembly 50 comprises a tube 51 that has threaded nuts shown in dotted lines at 52 and 52A at opposite ends thereof (also see FIGS. 3, 4 and 9). The end of the strut assembly 50 adjacent the cutter bar has a mounting screw 53 threaded in the nut 52, and also threaded through a nut 54 which bears against the front surface of an upright bracket plate 62 of a support bracket 56. The nut 54 is kept from turning by the head of a close fitting bolt 78 that extends through a hole in the bracket plate of wall of the bracket 56. The outer end portion 53A of the screw 53, which can be made smooth surfaced, with the threads removed, protrudes through an opening in the bracket plate 62 of the bracket 56 and is held from reverse axial movement by a "lynch pin" 46, which is a pin that has a spring-loaded hoop 45 held on a head portion of the pin 46. The pin 46 hold the screw captive in the bracket plate 62 of bracket 56. The spring-loaded hoop 45 can be pivoted away from the inserting end of the lynch pin 46 so the pin 46 can be placed in a cross bore in the end portion 53A of screw 53, and then the hoop 45 can be snapped back down so the hoop or ring rests against the inserting end of the pin 46 under a spring load, as shown in FIG. 11 to lock the lynch pin in place. The lynch pin keeps the screw 53 from pulling out of the bracket 56. The lynch pin hoop 45 encircles the outer end portion 53A of the screw 53 and also encircles the outer end of the bolt 78 so the screw 53 cannot rotate, as will be explained. Lynch pin 46 is a commercially available pin use in cross bores of shafts to hold the shafts from axial movement.

Figure 4:
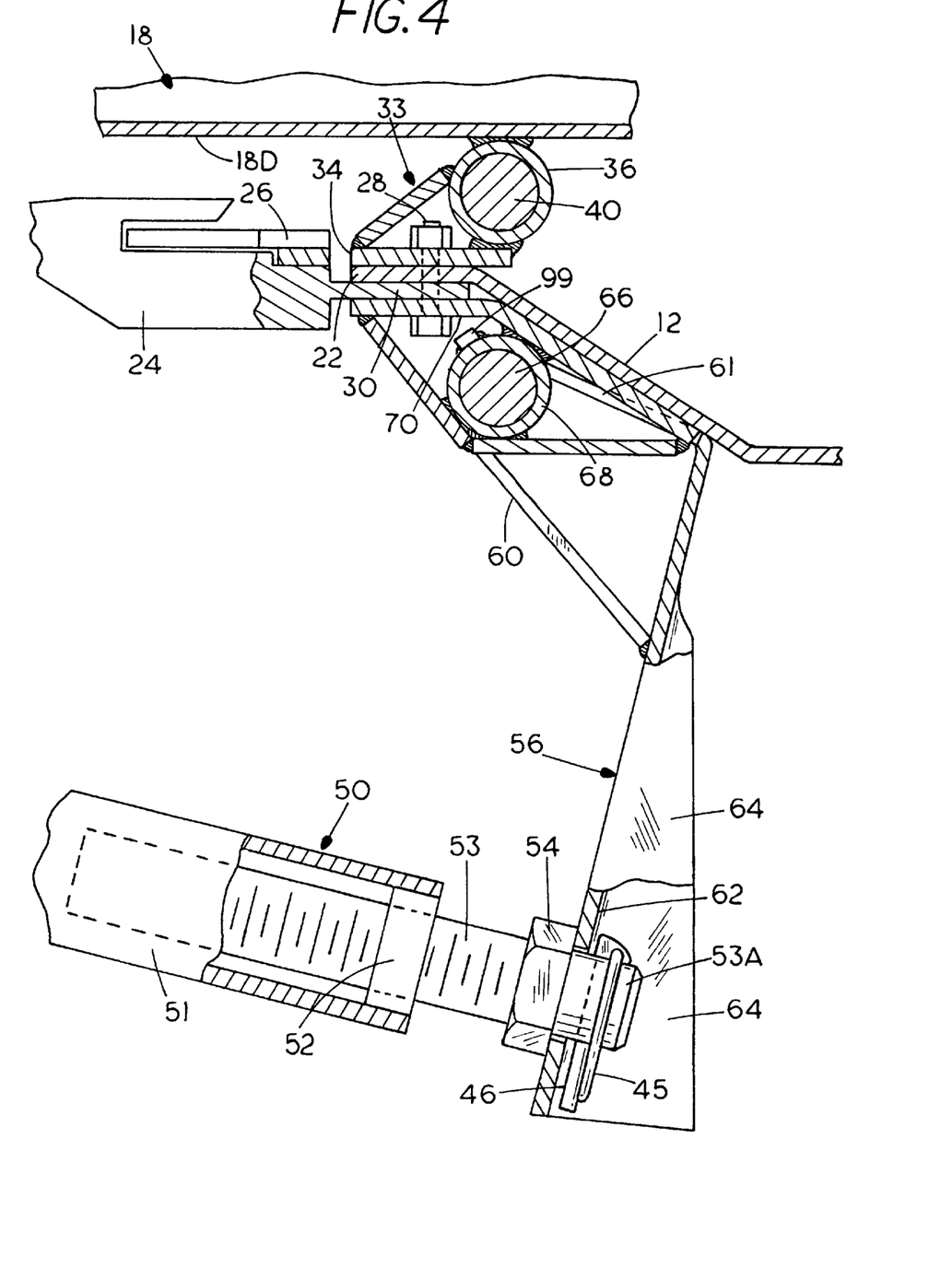
FIG. 4 is a side sectional view of a catch pan mounting frame taken on line 4—4 in FIG. 3.

The bracket 56 is also pivotally mounted relative to the cutter bar, and the upper end of the bracket 56 has a pair of coaxially aligned, laterally spaced hubs 58 that are supported on suitable straps 60 back to bracket plate or wall 62. The bracket plate 62, as seen in FIGS. 3 and 4, and other Figures, has flanges 64 are bent out of the plane of the bracket plate 62 and forming a taper at the lower end of wall 62. The end section 53A of screw 53, when the screw is threaded through the nut 54, extends out the backside of the bracket plate 62 between the flanges 64.

The hubs 58 are pivotally held in place with a headed pin 66 which extends through a central hub 68 (see FIG. 3) which is fixed on a mounting bracket plate 70 that is also held in place with the sickle guard bolt 28 that holds the sickle guard 24 in place. Thus, the hubs 58 are on opposite sides of the center support hub 68 of the mounting bracket plate 70, and the headed pin 66 passes through both hubs 58 and hub 68. The pin 66 is held in place with a lynch pin 46, shown in FIG. 3, which passes through a cross bore in the pin 66.

Figure 10:
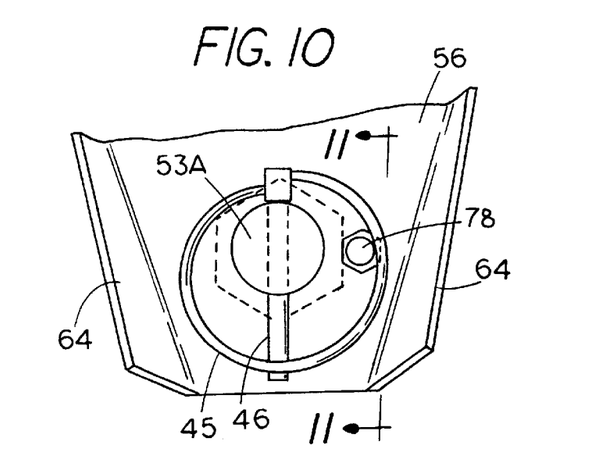
FIG. 10 is a rear view of a lower portion of a strut support bracket taken along line 10—10 in FIG. 2.

The upper side of the bracket 56 will rest against the header frame member 12, so that the bracket 56 will not pivot rearwardly but will carry compression load on the strut 50. The end portion 53A of the screw 53 that extends through the opening in the bracket plate or wall 62 has the lynch pin 46 therein, as stated. When the lynch pin ring or hoop 45 is snapped to engage the end of pin 46, as shown in FIGS. 10 and 11, and loops over the end portion 53A of screw 53, the ring or hoop 45 also loops over or encircles the bolt 78 that is secured on the bracket plate or wall 62 and has an end protruding out far enough so that if the screw 53 tends to rotate, the ring or hoop 45 will engage the bolt 78. The ring or hoop 45 and the end of bolt 78 prevent the screw 53 from turning relative to the bracket plate or wall 62.

The strut 50 extends upwardly, and as shown in FIG. 2, the upper end of tube 51 has the nut 52A welded therein. Nut 52A is of the opposite thread lead or opposite "hand" from the nut 52. A screw 80 which also has an opposite thread lead from the screw 53 is threaded into the nut 52A, and is supported in a swivel connector 82 to the bottom of the respective catch pan. The swivel connector (see FIG. 9) is formed from a nut 83A that has pivot pins 83 welded on opposite sides. The pins 83 are supported in openings on dependent legs 84 of a U-shaped bracket 85 that is fixed to the bottom wall of each pan 18 and 20. Bracket 85 and pivoting nut 83A form a swivel connection at the outer end of the catch pans 18 and 20. A lock nut or jam nut 83B can be used against the nut 83A to keep the screw 80 from turning in nut 83A. By turning the tube 51 of the strut assembly 50, the strut length can be changed by the threads on the screws 53 and 80. Since the screws are opposite hand or lead, they will both lengthen when the tube 51 is rotated in one direction and shorten when the tube 51 is rotated in the opposite direction. Thus, by turning the tube 51, the angle of the base plate 18D or 20D of the associated grain catch pan 18 or 20 can be changed.

The catch pans 18 and 20 are shown in more detail from a top view in FIG. 6, and each of the pans 18 and 20 is provided with a continuous rim 18A and 20A, respectively, on the pans 18 and 20. The rims 18A and 20A are each high enough so that they will not permit grain to fall off the pans, but will let it be carried back toward the conveyor on the combine header. The forward ends of each pan 18 and 20 is provided with a pick-up rod 90 that is welded to a strap 92 which is held with a single bolt 93 on the base wall of each of the pans. The rods 90 can be curved upwardly at the forward ends.

As shown, the forward ends of the pans 18 and 20 have a strap 95 that is formed into a "V" with a rounded tip welded to the flanges and closes the space between the flanges 18A, 18B and 20A, 20B. The strap 95 has a hole in the "V" end through which the rod 90 extends at each pan. The rods 90 are not welded or fixed to straps 95.

The rods are thus held in with a single bolt on the pans through the straps 92. The straps 92 extend up to abut against the inner surface of the reinforcing straps 95 to close any gaps at the front end. The rods are thus held in place with a single bolt and supported where they pan through the straps 95.

Additionally, as can be seen in FIG. 6, the opposite side edges at the leading ends of the pans 18 and 20 have a different taper on each side. One of the slots 44 for the stalks to be cut will have a relatively sharp angle lead in from the pans 18 and 20, and the adjacent opening or slot 44 will have a more gently tapered lead in to insure guiding the stocks into position for cutting more readily. The intersection of the tapered leading edges of the pans forming each slot 44 for the stalks of crop are offset in the fore and aft (longitudinal) direction so the stalks being guided tend to feed sequentially from each side and do not bunch up as much.

The pans 20, which are every other pan, have forward ends 20B which are positioned rearwardly of the forward ends 18A of the adjacent pans 18. This longitudinal offset is illustrated by the arrow 96, and can be approximately three inches or so, so that the guiding action on the stalks varies at adjacent guide slots 44. One edge 18B and 20B of each pan, respectively, is more gently tapered than the opposite edge at the lead-in end of the same pan, as shown at 18C and 20C. In other words the angle from a central axis indicated at 98 of each pan 18 or 20 to the edge 20B or 18B will be smaller than the angle from the central axis 98 to the opposite side edge 18C or 20C. The overall length of the pans 18 and 20 can be in the range of 5 feet for the pans 18, and 4 feet 9 inches for the pans 20. In the form shown in FIG. 5, the short length lead in along the edges 18C or 20C can have a length of about 18 to 20 inches, and the lead in edges 18B and 20B can be in the range of 24 inches. The pans have a width that varies depending on the width of the rows. For a 36 or 38 inch row, the pans can be 15 inches wide, but for a 30 inch row the pans would be about 12 inches wide.

Figure 8:
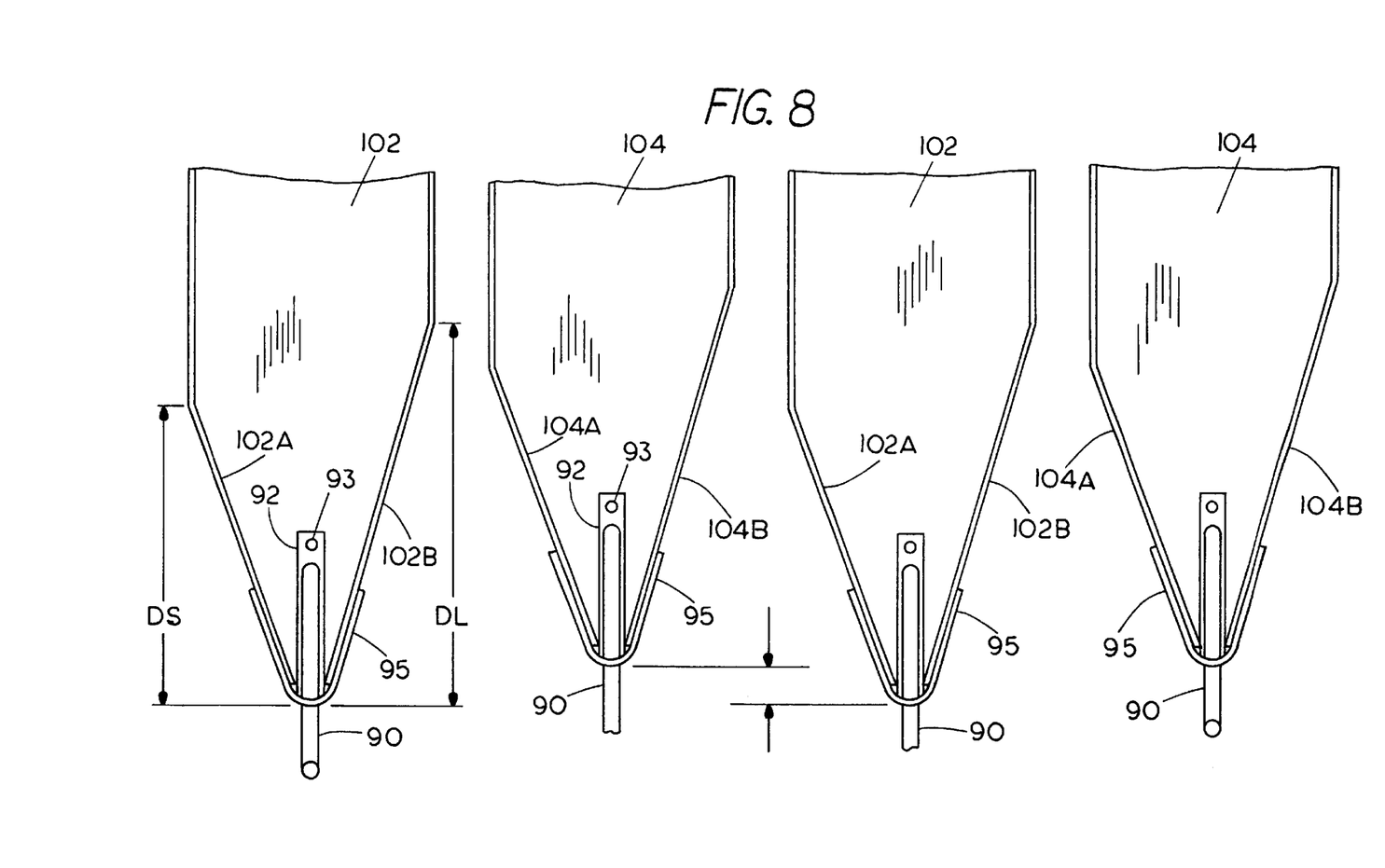
FIG. 8 is a top view of outer end of modified catch pans of the present invention.

In FIG. 8, modified pans 102 and 104 are shown, but they use the same principles of the invention. in this form the short lead in taper 102A and 104A are all the same length and orientation, and the longer lead in tapers 102B and 104B are also the same orientation. The lead in patterns repeat across the width of the header. The pans 102 and 104 are identical at the lead in ends shown abut are also different lengths. The pans 104 are about three inches shorter that the pans 102, so the leading ends are set back for the pans 104. The pans are constructed and mounted as previously explained and have upright rim walls along the edges. The same sequential feeding is achieved. In the form shown in FIG. 8, the longitudinal distance DS of the intersection of the taper of the shorter edges 102A and 104A with the side edges of the pans measured from the from the tip is about 20 inches and on the longer taper the distance DL is about 24 inches.

The hinging of the bracket 56 and the pans, as well as the mounting of the ends of the strut 50 permit some upward movement of the pans if they constat the ground or obstructions such as rocks or mounds of dirt. A lug 99 on one or both of the hubs 58 to limit upward pivoting when the lug 99 engages plate 70 (see FIG. 4). The lynch pin 46 permits some sliding of the screw 53 forwardly and the screw 53 can cock in the hole in the bracket plate 62. While the pivot axes of pins 40 and 66 are offset, the bracket 56 can pivot forwardly as the pans pivot upwardly. The rearward pivoting of bracket 56 is limited by the frame member 12.

Removal of the individual pans for servicing the sickle or sickle guards in a location on the cutter bar involves releasing lynch pin 46 and pulling screw 53 out of the bracket 56 and lifting the pans until pin 40 can be withdrawn laterally. The bracket 56 is removed after pulling the pin 66 and then the bolted parts can be removed. Installation is the reverse. Both processes are rapid so there is little time delay.

The forward ends of the pans also can pivot upwardly individually about pivot pins 40. The brackets 56 will pivot away from the cutter bar as the front end of the pans raise. The forward end of the pans can pivot up about two feet. The difference in the feeding action with the different inclinations insures that various crop condition can be accommodated easily. The grain catch pans are easy to attach and remove, as well as being easily adjusted. The pans increase efficiency of the harvest by picking up more downed stalks of row crop and saving grain that otherwise would be shattered and lost.

Although the present invention has been described with reference to preferred embodiments, workers skilled in the art will recognize that changes may be made in form and detail without departing from the spirit and scope of the invention.

What is claimed is:

1. An apparatus for catching grain being harvested using a combine header having a cutter bar, comprising a plurality of pans that are elongated in fore and aft direction mounted on said cutter bar, said pans having a base wall positioned above the cutter bar and being individually pivotally mounted about a horizontal axis relative to the cutter bar, upstanding flanges along said pans on opposite longitudinal edges thereof, a support for rotating the base wall of the pans about the horizontal axis, and a forward end of each of the pans being formed at angles tapering from a central point, a first tapered side of the forward end differing in length from a second tapered side of the forward end, and which pans are aligned with edges of adjacent pans to form guides for grain stalks, the first tapered side terminating at a different fore and aft location from the second tapered side of an adjacent pan.

2. The apparatus of claim 1, wherein every other pan along the cutter bar has a point member that is positioned rearwardly of the point member of adjacent pans.

3. The apparatus of claim 1 including a separate support strut for supporting the forward end of each pan, extending from the forward end to a bracket mounted on the cutter bar, to provide for changing the angle of the pan about the horizontal axis.

4. The apparatus of claim 3, wherein said support strut comprises a strut tube that is threadably adjustable in length.

5. The apparatus of claim 1, wherein the pans each have a horizontal pivot pin, a separate hub for receiving the pivot pin at the cutter bar, and guides on each pan engageable with point portions of sickle guards forming part of the cutter bar for holding the pivot pin of the pan in position in the respective hub, the pivot pin being insertable into the hub laterally when the pans are pivoted upwardly and the guides moving to guiding position relative to such sickle guards when the pans are pivoted downwardly to a working position.

6. The apparatus of claim 4, wherein there is a support bracket mounted on the cutter bar and having a bracket plate extending downwardly, said strut having a screw at a cutter bar end with a screw end portion that extends through the bracket plate, a member to carry compressions loads from the strut and screw to a forward side of the bracket plate, and a pin in the screw portion on a rearward side of the bracket plate to retain the screw end portion from excessive forward movement relative to the bracket plate.

7. The apparatus of claim 1 and a guide rod at a forward end of each of the pans held in position with a single bolt in the base wall, the pans having upright flanges thereon at the forward end, a reinforcing strap folded to lie along the upright flanges and extend across the forward end, the guide rod passing through an opening in the reinforcing strap, and a single bolt securing an inner end of the guide rod to the pan base wall.

\* \* \* \* \*